United States Patent [19]
DePablo et al.

[11] 4,132,569
[45] Jan. 2, 1979

[54] RUTHENIUM RECOVERY PROCESS

[75] Inventors: Raul S. DePablo, Painesville; David E. Harrington, Mentor; William R. Bramstedt, Chardon, all of Ohio

[73] Assignee: Diamond Shamrock Corporation, Cleveland, Ohio

[21] Appl. No.: 845,437

[22] Filed: Oct. 25, 1977

[51] Int. Cl.$^2$ .............................................. B08B 3/08
[52] U.S. Cl. ........................................ 134/3; 134/10; 134/13; 252/415; 423/22; 423/491
[58] Field of Search ............... 134/3, 10, 13; 423/22, 423/491; 75/83, 121; 252/415

[56] References Cited

U.S. PATENT DOCUMENTS

| 3,573,100 | 3/1971 | Beer | 134/3 |
|---|---|---|---|
| 3,706,600 | 12/1972 | Pumphrey et al. | 134/3 |
| 3,761,312 | 9/1973 | Entwisle et al. | 134/3 X |
| 3,761,313 | 9/1973 | Entwisle et al. | 134/3 |
| 3,997,337 | 12/1976 | Pittie et al. | 423/22 X |
| 4,002,470 | 1/1977 | Isa et al. | 423/22 X |

OTHER PUBLICATIONS

Biswas et al., *Indian J. Chem.*, "A Note on the Alkali Nitrate Fusion for Quant. Est. of Ru", vol. 6, Jan. 1968, pp. 51–52.
Durkin, *Metallurgia*, "How to Descale Titanium", May 1954, p. 256.

*Primary Examiner*—Marc L. Caroff
*Attorney, Agent, or Firm*—John C. Tiernan

[57] ABSTRACT

Ruthenium is stripped from a catalyst or electrode substrate by immersion in a fluoboric acid solution, converted to ruthenium oxide, and the ruthenium oxide is then converted to the alpha ruthenium trichloride for use in the preparation of fresh catalyst and/or electrodes.

8 Claims, No Drawings

RUTHENIUM RECOVERY PROCESS

BACKGROUND OF THE INVENTION

The present invention relates to a process for the separation and recovery of ruthenium from substrates of catalysts and/or electrodes and, more particularly, to a process for the recovery of ruthenium in a form in which it can be directly recycled for the preparation of fresh catalyst and/or electrodes.

Various salts of ruthenium have long been known to have utility in a wide variety of catalytic applications. Most commonly, a suitable salt of ruthenium, either alone or with salts of one or more additional metals, was deposited on a catalyst support such as alumina, titania, zinconia, silica, or silica alumina.

More recently, ruthenium has found significant commercial application as a coating for electrodes, particularly so-called dimensionally stable anodes. In such applications, the ruthenium may be deposited by electroplating or by other deposition means, either as the metal or in the form of a suitable salt, on an electrode substrate such as, for example, titanium, tantalum, or the like. Such electrodes and the method of their preparation are described, for example, in U.S. Pat. No. 3,096,272, U.S. Pat. No. 3,236,756, U.S. Pat. No. 3,265,526, and U.S. Pat. No. 3,711,385 to mention but a few.

The wide variety of advantages obtained by the use of such electrodes almost immediately established them as commercially significant. Since their first introduction, these electrodes have not only found almost universal acceptance in their original commercial applications, but are continually being modified for an ever-widening variety of additional commercial applications. This, in turn, made it more and more economically desirable to recover the ruthenium from used or defective anodes.

Historically, the treatment and recovery of precious metals and their salts, at least at the commercial level, has been largely a matter of proprietary information rigidly maintained as confidential of which a little, if any, has been published in the patent or technical literature. U.S. Pat. No. 3,761,313 (issued Sept. 25, 1973) discloses and claims a method of stripping the coating from such electrodes by immersing the electrode in an aqueous solution of hydrofluoric acid and at least one other strong mineral acid (other than nitric acid). In spite of this, the accepted commercial procedure for removal of the noble metal coating from such electrodes continues to be a mechanical abrasive procedure (such as, for example, the so-called wheel-abrator process), even though this contaminates the precious metal residue with large quantities of iron filings, sand, and hydrochloric acid. In fact, in commercial application, such a mechanical abrasive procedure provides residues containing only about one to ten percent (on a dry basis) precious metal.

SUMMARY OF THE INVENTION

The novel process of the present invention provides for recovery of ruthenium not only in high yield but in a form which, for most applications, can be directly employed in preparation of fresh catalyst and/or electrodes. In the process of the present invention, the ruthenium is: (a) stripped from the catalyst and/or electrode by immersing the catalyst or electrode in a hydrofluoric acid based stripping solution, in which the ruthenium coating is flaked from the substrate and allowed to precipitate to the bottom of the stripping container; (b) the insoluble precipitate is oxidized to ruthenium tetroxide in an alkali metal hypochlorite solution; and (c) the ruthenium tetroxide is distilled, the vaporous ruthenium tetroxide then being passed to a collection means containing concentrated hydrochloric acid, in which the ruthenium tetroxide is condensed and converted to ruthenium trichloride.

There precipitate can be directly oxidized or converted to the tetroxide, or it can first be converted to the alkali metal ruthenate, then oxidized. In the direct oxidation procedure, the precipitate, the ruthenium containing insoluble residue from the stripping solution, is suspended in an excess of alkali metal hydroxide solution and gaseous chlorine is bubbled through the suspension until the solution becomes acidic to phenolphthalein. In this procedure, the alkali metal hydroxide acts as a suspending agent and the bubbling of chlorine gas through the suspension promotes in situ formation of alkali metal hypochlorite, which oxidizes the ruthenium to ruthenium tetroxide.

Alternatively, the oxidation can be preceded by a fusion step, in which the ruthenium containing insoluble residue from the stripping solution is mixed with an alkali metal nitrate, and this mixture is added in small portions to molten alkali metal hydroxide where the ruthenium is converted to the corresponding alkali metal ruthenate. Any alumina, titanium, silica, etc., will be converted into the corresponding alkali metal aluminate, titanate, silicate, etc. When all the mixture has been dissolved in the molten alkali metal hydroxide, it is cooled and dissolved in water to form the alkali metal hydroxide suspension, through which gaseous chlorine is bubbled to form the hypochlorite, proceeding as described above. For convenience, this alternative procedure, adding the fusion step, will be referred to hereinafter as the "fusion process," as distinguished from the "direct oxidation process."

The fusion process for oxidation of the ruthenium can be employed to recover ruthenium from any catalyst or electrode, generally without regard to the conditions to which the catalyst and/or electrode was previously subjected. The direct oxidation process, on the other hand, can generally be employed effectively only where the catalyst or electrode was not subjected to substantial periods at temperatures in excess of about 500° C. Under such conditions, it appears significant amounts of ruthenium dioxide may have been formed and that the sodium hypochlorite oxidation, by itself, will not further oxidize all the ruthenium dioxide to ruthenium tetroxide as readily, or as in as satisfactory a yield, as when the added fusion step is employed.

PREFERRED EMBODIMENT

The preferred process of the present invention includes the additional fusion step, the stripping solution comprises a mixture of hydrogen peroxide and fluoboric acid ($HBF_4$), and the precipitate is mixed with approximately a stoichiometric equivalent of potassium nitrate, and this mixture is then dissolved in a large stoichiometric excess of molten potassium hydroxide. The precipitate from the stripping step may optionally be washed in hydrofluoric acid to remove any titanium or tantalum and/or hydrochloric acid to remove any tin, antimony or copper.

The use of fluoboric acid (which acts more slowly than hydrofluoric acid) permits much closer control of the stripping step, thereby reducing the unnecessary loss of substrate and/or inefficient employment of the acid. Further adjustment of the stripping step can be achieved by addition of a suitable peroxide, preferably hydrogen peroxide. In general, the molar ratio of peroxide to fluoboric acid should be from about 0.01:1 to about 2:1 and, preferably, from about 0.05:1 to about 0.5:1.

The following examples will serve by way of illustration and not by way of limitation to describe the process of the present invention.

EXAMPLE I

Two dimensionally stable anodes were stripped in fluoboric acid ($HBF_4$)-based solutions. The solid solution flaked from the titanium substrate and accumulated on the bottom of the stripping container. The solutions were filtered, residuals collected, and dried. The $HBF_4$ containing solutions were evaporated to dryness. The residuals and evaporated filtrates were analyzed by X-ray fluorescence spectrometry (XRF) and x-ray diffraction (XRD).

The first was stripped in a solution containing 48% $HBF_4$ (fluoboric acid) only. The residual from this stripping procedure is Sample 1A, and the evaporated filtrate 1B. The second anode was stripped in a solution containing 40 ml of 48% $HBF_4$ and 10 ml of 30% hydrogen peroxide ($H_2O_2$). The residual from this stripping procedure is Sample 2A, and the evaporated filtrate is D.

XRD analysis indicated that the residuals (1A and 2A) were composed of $RuO_2$ as the major constituent. Filtrates (1B and 2B) contained $TiOF_2$. The results of the analysis are described in Table I.

Table I

| | XRF Qualitative Analysis* of Filtrates and Residuals | | | |
|---|---|---|---|---|
| | Sample | | | |
| Element | 1A | 2A | 1B | 2B |
| Sn | L | M | S | S |
| Sb | M | S | — | — |
| Ta | L | M | S | S |
| Ti | M | L | L | L |
| Ru | L | L | — | — |
| Rh | M | — | — | — |
| Cu | L | L | — | — |
| Ir | — | S | — | — |

*L = large;
M = moderate;
S = small
(Quantity estimated by relative peak heights).

The residuals were subsequently washed first in hydrofluoric acid and then in hydrochloric acid. This further upgraded the samples and removed substantially all the non-ruthenium components.

EXAMPLE II — DIRECT OXIDATION PROCESS

If not in a powdered condition, the sample (such as produced in Example I) was ground and freed from organic matter by heating in air at 350°–400° C. It was then suspended in an excess of sodium hydroxide solution and chlorine was bubbled through the suspension until the solution became acidic to phenolphthalein. Air was then passed, after which the solution was brought to a boil, and maintained there for a period of about 10 to 15 minutes. The vapors were passed to a condenser whose delivery tube fed to a container of cool concentrated hydrochloric acid. The ruthenium —HCl solution was allowed to stand until all the ruthenium tetroxide had reacted with the HCl (an aliquot was tested to show if any ruthenium VIII was present). This solution may be used directly (for instance, to prepare coating solution), or may be evaporated to dryness to obtain $RuCl_3 \times H_2O$. Table II presents results obtained using this process.

Table II

| Ruthenium Recovered from Spent Catalyst Via Hypochlorite Process | | |
|---|---|---|
| Catalyst Taken, g | Composition, % Ru on $Al_2O_3$ | % Ru Recovered |
| 6.483 | 1.09 | 79 |
| 8.585 | 0.94 | 92 |
| 7.455 | 0.94 | 90 |
| 7.371 | 1.02 | 85 |
| 5.864 | 1.02 | 85 |
| 17.257 | 1.01 | 91 |
| 3.349 | 4.4 | 87 |
| 7.250 | 0.93 | 90 |
| 7.200 | 0.93 | 91 |
| | Average = | 87.7% |

EXAMPLE III — FUSION PROCESS

As in Example II, if not already in the powdered condition, the sample was ground and freed from organic matter by heating in air at 350°–400° C. The powdered sample was then mixed with approximately the stoichiometric amount of potassium nitrate required to oxidize the ruthenium (and any other oxidizable component) to their respective highest valences. A nickel crucible was charged with about 4–5 times the theoretical amount of potassium hydroxide required to transform all the ruthenium into potassium ruthenate (plus the theoretical amount necessary to convert any alumina, titanium, silica, etc., to the corresponding aluminate, titanate, silicate, etc.). The caustic was then melted and heated to a temperature of about 550° C. The mixture was then added in small portions to the molten potassium hydroxide with stirring, maintaining the temperature of approximately 550° C. After all the mixture had been added to the molten caustic, the crucible was maintained at a temperature of about 500°–550° C. for approximately 1 hour (or until all the mixture had been dissolved). The crucible was then cooled to a temperature of less than about 100° C. and cautiously submerged in warm (50°–80° C.) water to dissolve all the contents of the crucible. The temperature was reduced to below about 10° C., and the solution was adjusted to a volume of approximately 200 ml per theoretical gram of ruthenium. This was, generally, most expeditiously achieved by simply adding crushed ice directly to the solution. The solution was then transferred to a glass distillation pot provided with stirring and having inlets for air and chlorine. Vapors from this pot were passed through a condenser to three containers of concentrated hydrochloric acid arranged in series, the last two being placed in an ice bath. By maintaining the cooling water in the condenser at a temperature of about 26°–27° C., it is possible to prevent solidification of the ruthenium tetroxide, until it reached the concentrated hydrochloric acid. Chlorine was bubbled through the solution (about 4–5 bubbles per second) while stirring and simultaneously sweeping the gas phase with air. When the solution was acidic to phenolphthalein, the chlorine was shut off, but the passage of air was continued to prevent any back absorption. The solution was then heated to the boiling point (approximately 101°–102° C.) and maintained at that temperature for about 15–20 minutes, while continuing the passage of air. When distillation was completed, the distillation pot was disconnected from the first condenser and the ruthenium solution was allowed to stand for about 15 hours. Alternatively, the solution can be boiled under an efficient condenser, which will greatly accelerate transformation of the ruthenium tetroxide and ruthenium tetrachloride into ruthenium trichloride and remove any free chlorine.

Again, as in Example II, the acidic solution of ruthenium trichloride may be used directly for preparation of catalysts or anodes and/or coatings, or may be concentrated in a steam bath and taken for dryness in an oven at 105°–110° C. to product a solid residue of $RuCl_3 \times H_2O$. Tables IV and V below present recoveries obtained by the fusion process.

Table IV

Ruthenium Recovered from Different Samples Via Fusion Procedure

| Sample Type | Sample Composition | | Sample Taken (g or ml) | % Ru Recovered |
|---|---|---|---|---|
| Spent Catalyst | 4.4% Ru, | 95.6% $Al_2O_3$ | 6.025 | 85 |
| Spent Catalyst | " | " | 6.186 | 90 |
| Spent Catalyst | " | " | 6.257 | 87 |
| Spent Catalyst | " | " | 4.130 | 89 |
| Spent Catalyst | " | " | 3.075 | 91 |
| Spent Catalyst | 2.6% Ru, | 97.4% $TiO_2$ | 1.006 | 91 |
| Spent Catalyst | 4.1% Ru, | 95.9% $Al_2O_3$ | 4.150 | 94 |
| Spent Catalyst | " | " | 4.168 | 91 |
| Spent Catalyst | 5.9% Ru, | 94.1% $Al_2O_3$ | 39.16 | 101 |
| Spent Catalyst | " | " | 40.0 | 91 |
| Spent Catalyst | " | " | 40.0 | 98.5 |
| Spent Catalyst | " | " | 40.0 | 97.0 |
| Spent Catalyst | " | " | 40.0 | 97.0 |
| Spent Catalyst | " | " | 100.0 | 94.5 |
| Spent Catalyst | " | " | 99.0 | 88.4 |
| | | | Average Recovery = | 92.4% |

Table V

Ruthenium Recovered from Different Samples Via Fusion Procedure

| Sample Type | Sample Composition | Sample Taken (g or ml) | % Recovered |
|---|---|---|---|
| Mixed Ru Oxides | 70% Ru | 51.29 g | 96 |
| Mixed Ru Oxides | " | 56.02 | 96.5 |
| Mixed Ru Oxides | " | 100.09 | 96.6 |
| Mixed Ru Oxides | " | 37.19 | 96.5 |
| | | Average = | 96.4% |
| Beer's Solution | 42 gpl Ru, 43 gpl Ti | 500 ml | 95.5 |
| Beer's Solution | 42 gpl Ru, 43 gpl Ti | 1000 | 95 |
| Beer's Solution | 37.8 gpl Ru | 600 | 98.3 |
| Beer's Solution | " | 600 | 92.2 |
| Beer's Solution | " | 600 | 90.5 |
| | | Average = | 94.3% |
| Metallic Ru | 100% Ru | 20 g | 92.5 |
| Metallic Ru | " | 20 | 94.7 |
| Metallic Ru | " | 20 | 95.7 |
| Metallic Ru | " | 20 | 98.9 |
| Metallic Ru | " | 20 | 99.0 |
| Metallic Ru | " | 20 | 97.8 |
| Metallic Ru | " | 20 | 94.6 |
| Metallic Ru | " | 40 | 96.7 |
| Metallic Ru | " | 40 | 95.6 |
| | | Average = | 96.2% |

A modification of Example III may improve the total amount of ruthenium recovered. After the chlorination is discontinued (when the pot solution is about 0.05 N in hydroxide) and the solution is allowed to stand at room temperature for 15–20 hours, the chlorination is reinitiated, as in the original procedure. In this way, it is possible to recover 99% from 57 grams of Ru in a volume of 8 liters. It is very probable that in such an alternative procedure, the standing period of 15–20 hours could be shortened without decreasing the yield, and six to eight hours would probably be sufficient.

It seems that the oxidation of ruthenium VI to ruthenium VIII is rather a slow reaction. For this reason, it should be allowed sufficient time to proceed to completion, either in the distillation pot or in a separate container. The modification noted above might be the key to very good recoveries, particularly, working with much more highly concentrated solutions of ruthenium. It also might help the recoveries in the direct oxidation process.

In view of the foregoing, it will be clear to those skilled in the art that many changes and substitutions can be made in the steps and operating conditions of the novel process of the present invention without prodding from the scope of the invention herein disclosed. It is, therefore, our intention to be limited only by the appended claims.

What is claimed is:

1. A process for recovery of ruthenium from a coating on a catalytic or electrode substrate, comprising:
   (a) stripping the ruthenium-containing coating from the substrate by immersion in a fluoboric acid stripping solution containing an amount of fluoboric acid effective to strip the coating from the substrate, wherein said ruthenium coating is flaked from the substrate and permitted to precipitate to the bottom of said solution;
   (b) separating and collecting said precipitate;
   (c) subjecting said precipitate to oxidation in an alkali metal hypochlorite solution containing an amount of hypchlorite effective to oxidize said ruthenium, whereby said ruthenium is oxidized to ruthenium tetroxide; and
   (d) distilling said ruthenium tetroxide and feeding the distilled ruthenium tetroxide into a concentrated hydrochloric acid solution containing an amount of hydrochloric acid effective to convert said distilled ruthenium tetroxide to ruthenium trichloride.

2. The process according to claim 1 wherein said stripping solution is a mixture of a peroxide compound and fluoboric acid.

3. The process according to claim 1 wherein prior to said oxidation of said precipitate, said precipitate is mixed with approximately a stoichiometric equivalent of an alkali metal nitrate, and said mixture is added to at least a 100% stoichiometric excess of molten alkali metal hydroxide, dissolving said mixture in said alkali metal hydroxide, whereby said ruthenium is converted to the corresponding alkali metal ruthenate.

4. The process according to claim 3 wherein said stripping solution is a mixture of a peroxide compound and fluoboric acid.

5. The process according to claim 2 wherein after collecting said precipitate, said precipitate is washed with hydrofluoric acid.

6. The process according to claim 2 wherein after collecting said precipitate, said precipitate is washed with hydrochloric acid.

7. The process according to claim 4 wherein after collecting said precipitate, said precipitate is washed with hydrofluoric acid.

8. The process according to claim 4 wherein after collecting said precipitate, said precipitate is washed with hydrochloric acid.

* * * * *